United States Patent
Misawa

(10) Patent No.: US 10,661,661 B2
(45) Date of Patent: May 26, 2020

(54) VEHICLE, CHARGING APPARATUS AND SERVER FOR COORDINATION BY COMPATIBILITY

(71) Applicant: Toyota Jidosha Kabushiki Kaisha, Toyota-shi, Aichi-ken (JP)

(72) Inventor: Takahiro Misawa, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 103 days.

(21) Appl. No.: 15/729,122

(22) Filed: Oct. 10, 2017

(65) Prior Publication Data

US 2018/0099575 A1    Apr. 12, 2018

(30) Foreign Application Priority Data

Oct. 12, 2016    (JP) .................. 2016-200825

(51) Int. Cl.
| | |
|---|---|
| *B60L 11/18* | (2006.01) |
| *B60L 53/60* | (2019.01) |
| *B60L 50/50* | (2019.01) |
| *B60L 53/65* | (2019.01) |
| *B60L 53/30* | (2019.01) |

(Continued)

(52) U.S. Cl.
CPC .......... *B60L 11/1824* (2013.01); *B60L 50/50* (2019.02); *B60L 53/14* (2019.02); *B60L 53/30* (2019.02); *B60L 53/60* (2019.02); *B60L 53/65* (2019.02); *B60L 53/68* (2019.02); *B60L 2240/622* (2013.01); *B60L 2240/72* (2013.01); *B60L 2250/16* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01);
(Continued)

(58) Field of Classification Search
CPC ........ B60L 53/30; B60L 53/305; B60L 53/34; B60L 53/60; B60L 53/66; B60L 53/10
USPC .......................................... 320/109
See application file for complete search history.

(56) References Cited

U.S. PATENT DOCUMENTS

| | | | |
|---|---|---|---|
| 2011/0071932 A1* | 3/2011 | Agassi | ...................... B60L 3/12 705/34 |
| 2011/0302108 A1* | 12/2011 | Werner | .................. G06Q 50/06 705/412 |

(Continued)

FOREIGN PATENT DOCUMENTS

| | | |
|---|---|---|
| CN | 103459188 A | 12/2013 |
| JP | 2007-148590 A1 | 6/2007 |

(Continued)

*Primary Examiner* — David V Henze-Gongola
(74) *Attorney, Agent, or Firm* — Dinsmore & Shohl LLP

(57) ABSTRACT

In a server, when a control portion receives second charging-method information indicating an external charging method corresponding to a vehicle, from the vehicle through a communication unit, the control portion extracts a charging apparatus compatible with the vehicle, by referring to first charging-method information indicating an external charging method corresponding to the charging apparatus and a second charging-method information DB. The control portion controls the communication unit such that the communication unit transmits positional information of the extracted charging apparatus to the vehicle.

2 Claims, 16 Drawing Sheets

(51) Int. Cl.
*B60L 53/14* (2019.01)
*B60L 53/68* (2019.01)

(52) U.S. Cl.
CPC ............ *Y02T 90/168* (2013.01); *Y02T 90/169* (2013.01); *Y04S 30/12* (2013.01); *Y04S 30/14* (2013.01)

(56) References Cited

U.S. PATENT DOCUMENTS

| | | |
|---|---|---|
| 2012/0109519 A1 | 5/2012 | Uyeki |
| 2012/0123670 A1* | 5/2012 | Uyeki ................... H02J 7/0027 701/300 |
| 2014/0028257 A1 | 1/2014 | Nishida |
| 2015/0286965 A1 | 10/2015 | Amano et al. |
| 2017/0046762 A1 | 2/2017 | Arita et al. |
| 2017/0282736 A1* | 10/2017 | Goei ..................... B60L 53/665 |

FOREIGN PATENT DOCUMENTS

| | | |
|---|---|---|
| JP | 5760625 B2 | 8/2015 |
| WO | 2012/140486 A2 | 10/2012 |
| WO | 2015063967 A1 | 5/2015 |
| WO | 2016020997 A1 | 2/2016 |

* cited by examiner

FIG. 2

| POSITIONAL INFORMATION | CHARGING APPARATUS A1 | CHARGING APPARATUS B1 | CHARGING APPARATUS C1 | CHARGING APPARATUS D1 | CHARGING APPARATUS E1 |
|---|---|---|---|---|---|
| | GPS DATA A2 | GPS DATA B2 | GPS DATA C2 | GPS DATA D2 | GPS DATA E2 |
| | ... | ... | ... | ... | ... |

| EXTERNAL CHARGING METHOD | | |
|---|---|---|
| CONTACT CHARGING | AC CHARGING | AC100V |
| | | AC200V |
| | DC QUICK CHARGING | CHADEMO |
| | | COMBINATION |
| NON-CONTACT CHARGING | WPT CLASS | WPT1 |
| | | WPT2 |
| | | WPT3 |
| | | WPT4 |
| | COIL METHOD | CIRCULAR |
| | | SOLENOIDAL |
| | PARKING ASSISTANCE METHOD | CAMERA |
| | | LOW ELECTRIC POWER |
| | | NONE |
| | EFFICIENCY IMPROVEMENT FUNCTION | FREQUENCY CONTROL |
| | | NONE |

FIG. 4

| EXTERNAL CHARGING METHOD | | | CHARGING APPARATUS Z1 |
|---|---|---|---|
| CONTACT CHARGING | AC CHARGING | 100V | O |
| | | 200V | — |
| | DC QUICK CHARGING | CHADEMO | O |
| | | COMBINATION | — |
| NON-CONTACT CHARGING | WPT CLASS | WPT1 | O |
| | | WPT2 | O |
| | | WPT3 | — |
| | | WPT4 | — |
| | COIL METHOD | CIRCULAR | O |
| | | SOLENOIDAL | — |
| | PARKING ASSISTANCE METHOD | CAMERA | — |
| | | LOW ELECTRIC POWER | O |
| | | NONE | — |
| | EFFICIENCY IMPROVEMENT FUNCTION | FREQUENCY CONTROL | — |
| | | NONE | O |

| EXTERNAL CHARGING METHOD | | | VEHICLE X1 |
|---|---|---|---|
| CONTACT CHARGING | AC CHARGING | 100V | O |
| | | 200V | O |
| | DC QUICK CHARGING | CHADEMO | — |
| | | COMBINATION | |
| NON-CONTACT CHARGING | WPT CLASS | WPT1 | O |
| | | WPT2 | O |
| | | WPT3 | — |
| | | WPT4 | — |
| | COIL METHOD | CIRCULAR | O |
| | | SOLENOIDAL | — |
| | PARKING ASSISTANCE METHOD | CAMERA | O |
| | | LOW ELECTRIC POWER | — |
| | | NONE | — |
| | EFFICIENCY IMPROVEMENT FUNCTION | FREQUENCY CONTROL | O |
| | | NONE | — |

| | EXTERNAL CHARGING METHOD | | CHARGING APPARATUS A1 | CHARGING APPARATUS B1 | CHARGING APPARATUS C1 | CHARGING APPARATUS D1 | CHARGING APPARATUS E1 | ... |
|---|---|---|---|---|---|---|---|---|
| CONTACT CHARGING | AC CHARGING | 100V | ○ | ○ | ○ | — | — | |
| | | 200V | ○ | ○ | — | — | — | |
| | DC QUICK CHARGING | CHADEMO | ○ | ○ | — | — | — | |
| | | COMBINATION | ○ | — | — | — | — | |
| NON-CONTACT CHARGING | WPT CLASS | WPT1 | ○ | ○ | | ○ | ○ | |
| | | WPT2 | ○ | ○ | | ○ | ○ | |
| | | WPT3 | ○ | — | | — | ○ | |
| | | WPT4 | ○ | — | | ○ | ○ | |
| | COIL METHOD | CIRCULAR | — | — | | — | ○ | |
| | | SOLENOIDAL | ○ | ○ | | ○ | — | |
| | PARKING ASSISTANCE METHOD | CAMERA | ○ | — | | — | — | |
| | | LOW ELECTRIC POWER | — | — | | ○ | — | |
| | | NONE | ○ | — | | — | ○ | |
| | EFFICIENCY IMPROVEMENT FUNCTION | FREQUENCY CONTROL | — | — | | ○ | — | |
| | | NONE | — | ○ | | — | ○ | |

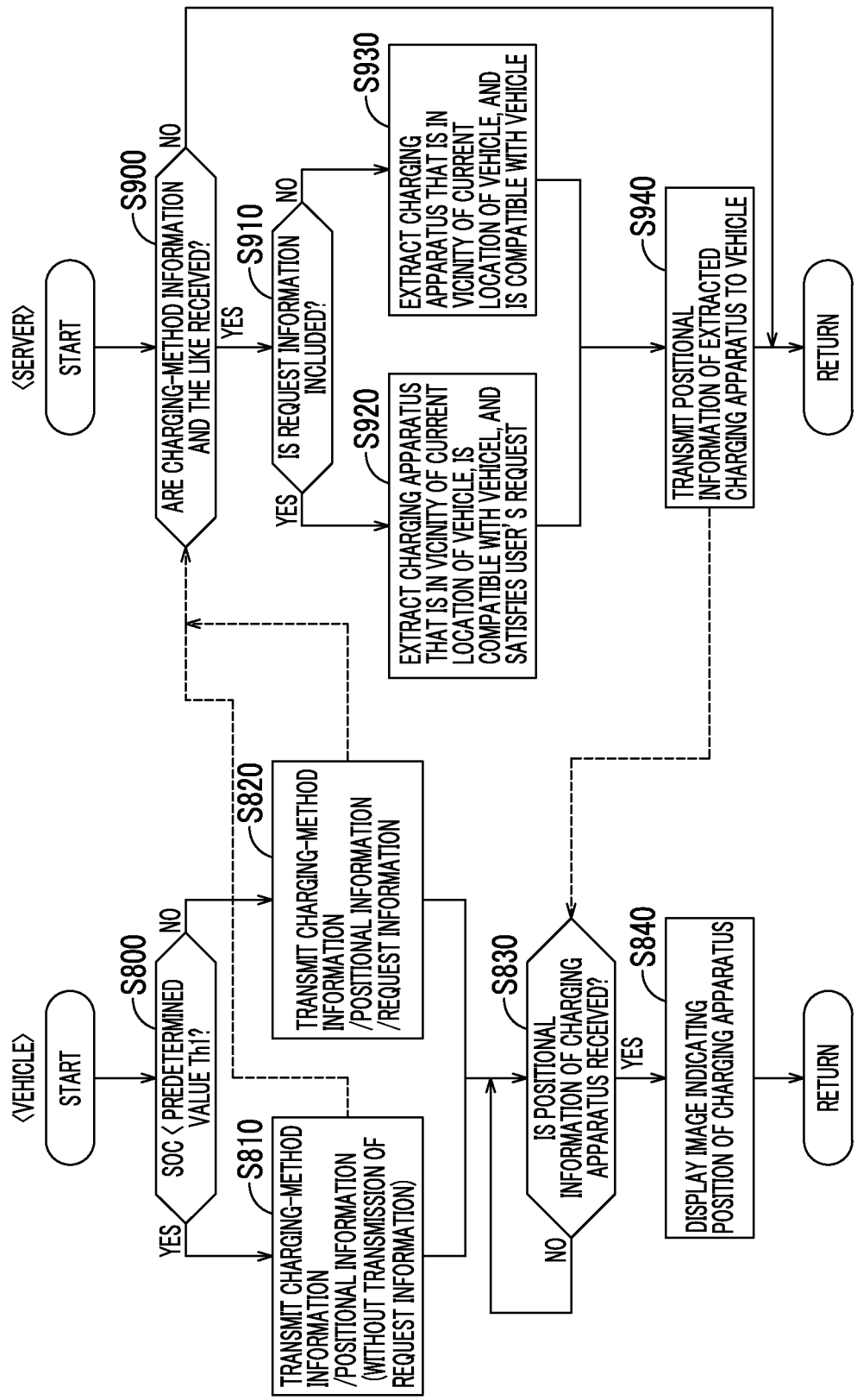

VEHICLE, CHARGING APPARATUS AND SERVER FOR COORDINATION BY COMPATIBILITY

CROSS-REFERENCE TO RELATED APPLICATIONS

This application claims priority to Japanese Patent Application No. 2016-200825 filed on Oct. 12, 2016, which is incorporated herein by reference in its entirety including the specification, drawings and abstract.

BACKGROUND

1. Technical Field

The disclosure relates to a server and a vehicle, and particularly relates to charging of an on-vehicle electrical storage device using electric power supplied from a charging apparatus outside a vehicle (hereinafter, referred to as "external charging").

2. Description of Related Art

Japanese Patent No. 5760625 (JP 5760625 B) discloses a center server which can communicate with as electrical automobile corresponding to external charging. When external charging is performed, positional information of a charging facility and identification information of an electrical automobile are transmitted from the electrical automobile to a center server. A processing unit of the center server determines the specification of the charging facility, based on the identification information received from the electrical automobile. Then, the processing unit stores information indicating the specification of the charging facility and the positional information of the charging facility, which are associated each other, in a storage device of the center server.

SUMMARY

In the technique disclosed in JP 5760625 B, positional information of charging apparatuses (charging facilities) with various specifications is stored in the server. In the server, in order to guide a user of a vehicle to the position of the charging apparatus, positional information of all the charging apparatuses is considered to be transmitted to the vehicle.

In this case, positional information of a charging apparatus corresponding to only a charging method not corresponding to the vehicle, is also transmitted from the server to the vehicle. Then, a user searches for positional information of a charging apparatus that is compatible with the vehicle, from among positional information of multiple charging apparatuses including the charging apparatus corresponding to only the charging method not corresponding to the vehicle. Such an operation is complicated for a user.

The disclosure provides a technique for allowing a user of a vehicle to easily recognize a position of a charging apparatus compatible with the vehicle.

A first aspect of the disclosure relates to server transmitting information regarding a charging apparatus to a vehicle to which external charging is applied, the external charging being charging of an on-vehicle electrical storage device using electric power supplied from the charging apparatus outside the vehicle. The server includes a communication unit, a memory, and a control portion. The communication unit is configured to communicate with the vehicle. The memory is configured to store first charging-method information indicating an external charging method corresponding to the charging apparatus, and positional information indicating an installation position of the charging apparatus in association with the charging apparatus. The control portion is configured to control the communication unit. When the control portion receives second charging-method information indicating an external charging method corresponding to the vehicle, from the vehicle through the communication unit, the control portion is configured to extract the charging apparatus compatible with the vehicle by referring to the first charging-method information and the second charging-method information. The control portion is configured to control the communication unit such that the communication unit transmits the positional information of the extracted charging apparatus to the vehicle.

In the server, the charging apparatus compatible with the vehicle is extracted, and the positional information of the extracted charging apparatus is transmitted to the vehicle. Accordingly, with the server, a user of the vehicle can easily recognize the position of the charging apparatus compatible with the own vehicle even without searching for the positional information of the charging apparatus compatible with the own vehicle, from among the positional information of plural charging apparatuses including a charging apparatus corresponding to only a charging method not corresponding to the own vehicle.

When the control portion receives request information indicating a user's request regarding the external charging, and the second charging-method information from the vehicle through the communication unit, the control unit may be configured to extract the charging apparatus that is compatible with the vehicle and satisfies the user's request, by referring to the first charging-method information, the second charging-method information and the request information.

In the server, the charging apparatus that is compatible with the own vehicle and satisfies the user's request is extracted, and the positional information of the extracted charging apparatus is transmitted to the vehicle. Accordingly, with the server, the user of the vehicle can easily recognize the position of the charging apparatus that is compatible with the own vehicle and also satisfies the user's request.

The communication unit may be further configured to communicate with the charging apparatus. When the control portion receives the first charging-method information and the positional information from the charging apparatus through the communication unit, the control portion may be configured to cause the memory to store the received first charging-method information and the received positional information in association with the charging apparatus.

In the server, when first charging-method information and positional information regarding a new charging apparatus are received, the received first charging-method information and the received positional information are stored in the memory. With the server, when a new charging apparatus is installed, the server receives first charging-method information and positional information, and then causes the memory to sequentially store the first charging-method information and the positional information regarding the new charging apparatus.

A second aspect of the disclosure relates to a vehicle to which external charging is applied, the external charging being charging of an on-vehicle electrical storage device using electric power supplied from a charging apparatus outside the vehicle, and the vehicle receiving information regarding the charging apparatus from a server. The server includes a first communication unit, a first memory, and a first control portion. The first communication unit is configured to communicate with the vehicle. The first memory is configured to store first charging-method information indicating an external charging method corresponding to the charging apparatus, and positional information indicating an installation position of the charging apparatus, in association with the charging apparatus. The first control portion is configured to control the first communication unit. The vehicle includes a second memory, a display device, a second communication unit, and a second control portion. The second memory is configured to store second charging-method information indicating an external charging method to which the vehicle corresponds. The display device is configured to display an image. The second communication unit is configured to communicate with the server. The second control portion is configured to control the second communication unit and the display device. The second control portion is configured to control the second communication unit such that the second communication unit transmits the second charging-method information to the server. When the first control portion receives the second charging-method information from the vehicle through the first communication unit the first control portion is configured to extract the charging apparatus compatible with the vehicle, by referring to the first charging-method information and the second charging-method information, and the first control portion is configured to control the first communication unit such that the first communication unit transmits the positional information of the extracted charging apparatus to the vehicle. When the second control portion receives the positional information from the server through the second communication unit, the second control portion is configured to control the display device such that the display device displays an image indicating a position of the charging apparatus according to the positional information.

In the vehicle according to the second aspect, an image indicating the position of the charging apparatus compatible with the own vehicle is displayed on the display device. Accordingly, with the vehicle, the user of the vehicle can easily recognize the position of the charging apparatus compatible with the own vehicle even without searching for the positional information of the charging apparatus compatible with the own vehicle, from among positional information of plural charging apparatuses including a charging apparatus corresponding to only a charging method not corresponding to the own vehicle.

The vehicle may further include an input unit. The input unit is configured to receive a user's request regarding the external charging. The second control portion may be configured to control the second communication unit such that the second communication unit transmits request information indicating the user's request and the second charging-method information to the server. When the first control portion receives the request information and the second charging-method information from the vehicle through the first communication unit, the first control portion may be configured to extract the charging apparatus that is compatible with the vehicle and satisfies the user's request, by referring to the first charging-method information, the second charging-method information, and the request information, and the first control portion is configured to control the first communication unit such that the first communication unit transmits the positional information of the extracted charging apparatus to the vehicle.

With the vehicle, an image indicating the position of the charging apparatus that is compatible with the own vehicle and satisfies the user's request may be displayed on the display device. Accordingly, with the vehicle, the user can easily recognize the position of the charging apparatus that is compatible with the own vehicle and also satisfies the user's request.

When state of charge (SOC) of the electrical storage device s less than a predetermined value, the second control portion may be configured to control the second communication unit such that the second communication unit does not transmit the request information to the server and transmits the second charging-method information to the server.

In the vehicle, in a case where the SOC of the electrical storage device is less than the predetermined value, even when the vehicle receives the user's request regarding the external charging, the vehicle does not transmit the request information to the server. Accordingly, an image indicating the position of the charging apparatus that does not satisfy the user's request among the charging apparatuses compatible with the own vehicle is also displayed on the display device. As a result, with the vehicle, in an emergency when the SOC of the electrical storage device is less than the predetermined value, since the charging apparatuses displayed on the display device are not refined according to the request information, the user can recognize the charging apparatus that is at a position closest to the current location of the own vehicle, among the charging apparatuses that are compatible with the own vehicle.

According to the disclosure, it is possible to provide a technique for allowing a user of a vehicle to easily recognize a position of a charging apparatus compatible with the own vehicle.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is a view illustrating an example of a positional information DB;

FIG. 3 is a view illustrating an example of external charging methods;

FIG. 4 is a view illustrating an example of charging-method information (charging-method information of a charging apparatus);

FIG. 5 is a view illustrating an example of charging-method information (charging-method information of a vehicle);

FIG. 6 is a view illustrating an example of a charging-method information DB;

FIG. 17 is a flowchart illustrating a processing procedure for causing a navigation device to display positional information of a charging apparatus, in Embodiment 3.

DETAILED DESCRIPTION OF EMBODIMENTS

Figure 1:
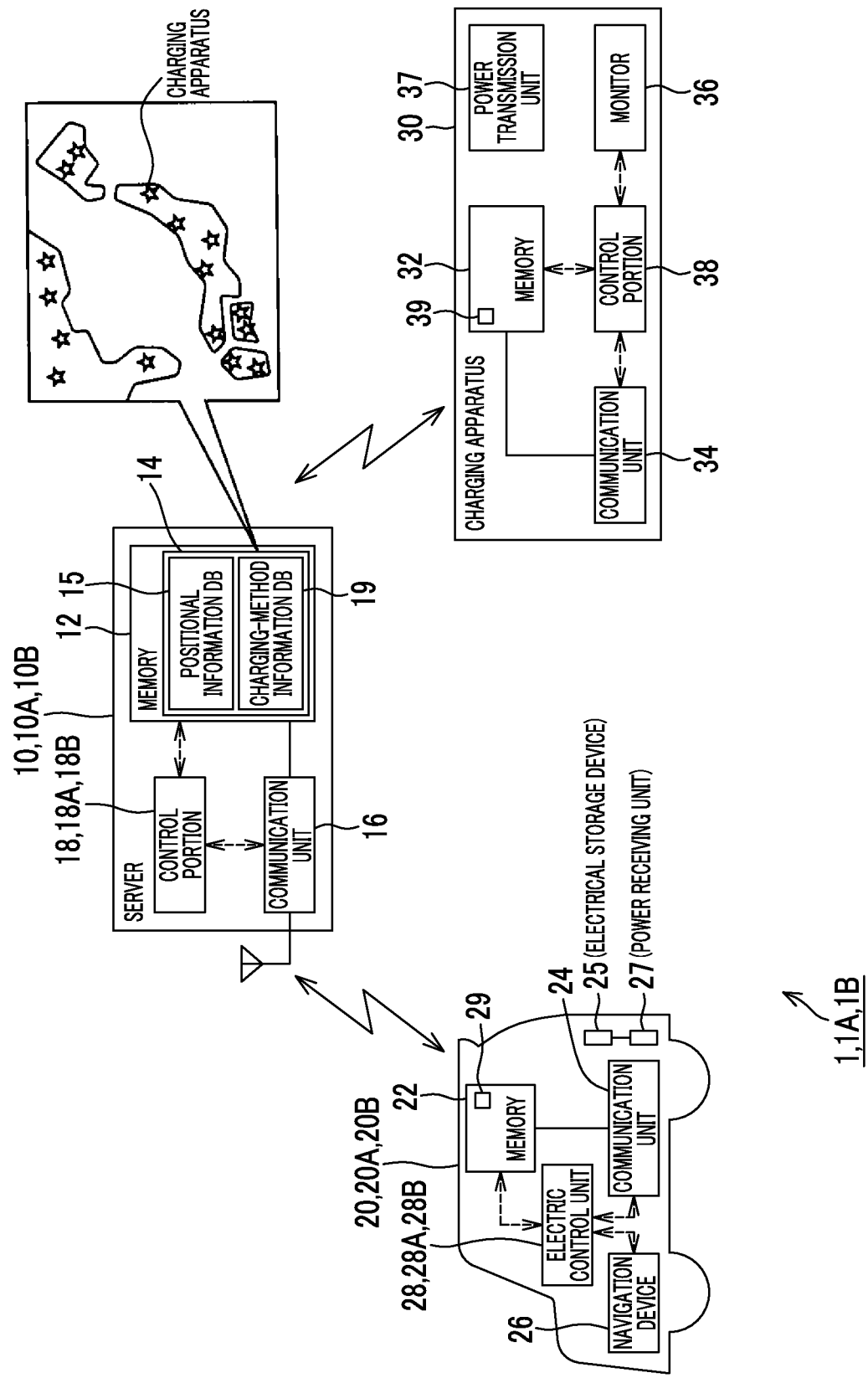
FIG. 1 is a view illustrating a schematic configuration of a charging system to which a server and a vehicle according to Embodiment 1 are applied.

Hereinafter, an embodiment will be described in detail referring to the drawings. A plurality of embodiments will be described, and configurations respectively described in the embodiments can be appropriately combined. The same reference numerals are given to the same or equivalent portions in the drawings, and the description thereof will not be repeated.

Embodiment 1

Configuration of Charging System

FIG. 1 is a view illustrating a schematic cost configuration of a charging system to which a server and a vehicle according to Embodiment 1 are applied. Referring to FIG. 1, a charging system 1 includes a server 10, a vehicle 20, and a charging apparatus 30. In FIG. 1, for the convenience of description, one charging apparatus 30 is described, but actually, a plurality of charging apparatuses 30 is included in the charging system 1. In the charging system 1, positional information indicating an installation position of the charging apparatus 30 that is in the vicinity of the current location of the vehicle 20 is provided from the server 10 to the vehicle 20. In this manner, a user of the vehicle 20 can recognize the position of the charging apparatus 30 that is in the vicinity of the current location of the vehicle 20.

The vehicle 20 corresponds to the charging of an on-vehicle electrical storage device 25 (described below) using electric power supplied from the charging apparatus 30 outside a vehicle (external charging). Although the details will be described below, there is a plurality of types of external charging methods. For example, there are "contact charging methods" in which electric power is supplied from the charging apparatus 30 to the vehicle 20 in a state where the charging apparatus 30 and the vehicle 20 are connected to each other by a charging cable (not illustrated), and "non-contact charging methods" in which electric power is supplied from the charging apparatus 30 to the vehicle 20 in a non-contact manner.

Depending on the type of the vehicle 20, there are a vehicle 20 which corresponds to both the contact charging methods and the non-contact charging methods, and a vehicle 20 which corresponds only to either the contact charging methods or the non-contact charging methods. The same is applied to the charging apparatus 30. For example, external charging of the vehicle 20 that corresponds to only the contact charging methods cannot be performed by the charging apparatus 30 that corresponds to only the non-contact charging methods (there is no compatibility).

The vehicle 20 includes the electrical storage device 25, a power receiving unit 27, a memory 22, a communication unit 24, a navigation device 26, and an electronic control unit 28.

As described above, the electrical storage device 25 is charged by external charging, for example. The electric power stored in the electrical storage device 25 is used to generate a traveling driving force for the vehicle 20, for example. The electrical storage device 25 is configured of a rechargeable battery such as a nickel-hydrogen battery or a lithium-ion battery, an electric double layer capacitor, or the like.

The power receiving unit 27 is configured to receive electric power from the charging apparatus 30. The electric power received by the power receiving unit 27 is stored in the electrical storage device 25. In a case where the vehicle 20 corresponds to the contact charging methods, the power receiving unit 27 includes a connection portion where a charging cable is connected, for example. In addition, in a case where the vehicle 20 corresponds to the non-contact charging methods, the power receiving unit 27 includes a power receiving coil for receiving electric power in a non-contact manner from a power transmission coil included in the charging apparatus 30, for example.

The memory 22 stores charging-method information 29 indicating external charging methods corresponding to the vehicle 20. The details of the charging-method information 29 will be described below. The memory 22 is configured of a flash memory, for example.

The communication unit 24 is configured to communicate with the server 10, for example. The communication unit 24 is configured of a communication module conforming to communication standards such as Wideband Code Division Multiple Access (W-CDMA) or Long Term Evolution (LTE), and wireless Local Area Network (LAN) standards such as Institute of Electrical and Electronic Engineers (IEEE) 802.11.

The navigation device 26 is a display device which can guide a user with a route for a destination for example. The navigation device 26 stores map information in an internal memory (not illustrated), for example. The navigation device 26 displays an image indicating the current location of the vehicle 20 on a map, by using information indicating the current location of the vehicle 20 obtained through Global Positioning System (GPS), and the map information. The map information may not be stored in the navigation device 26 in advance, and may be received from the server 10, as needed.

When the navigation device 26 receives positional information of the charging apparatus 30 that is in the vicinity of the vehicle 20, from the server 10 through the communication unit 24, the navigation device 26 displays an image indicating the position of the charging apparatus 30. The navigation device 26 is provided with a touch panel as an input unit where a user inputs information. A user manipulates the navigation device 26 through the touch panel, for example.

The electronic control unit includes a central pressing unit (CPU), an input and output interface, and the like (neither is illustrated). The electronic control unit 28 implements various functions of the vehicle 20, based on a signal from each sensor and information stored in the memory 22.

The charging apparatus 30 is configured to charge the electrical storage device 25 mounted in the vehicle 20, by using electric power supplied from a system power supply (not illustrated), for example. Depending on the type of the charging apparatus 30, there are a charging apparatus 30 which corresponds to both the contact charging methods and the non-contact charging methods, and a charging apparatus 30 which corresponds to only either the contact charging methods or the non-contact charging methods. The charging apparatus 30 includes a power transmission unit 37, a memory 32, a communication unit 34, a monitor 36, and a control portion 38.

The power transmission unit 37 is configured to supply electric power to the vehicle 20 by using electric power supplied from a system power supply, for example. In a case where the charging apparatus 30 corresponds to the contact charging methods, the power transmission unit 37 includes a charging cable so as to be connected to the vehicle 20. In addition, in a case where the charging apparatus 30 corresponds to the non-contact charging methods, the power transmission unit 37 includes a power transmission coil for transmitting electric power in a non-contact manner to the power receiving coil included in the vehicle 20, for example.

The memory 32 stores charging-method information 39 indicating external charging methods corresponding to the charging apparatus 30; and an identification (ID) of the charging apparatus 30. The ID is information for uniquely identifying the charging apparatus 30. The details of the charging-method information 39 will be described below. The memory 32 is configured of a flash memory, for example.

The communication unit 34 is configured to communicate with the server 10, for example. The communication unit 34 is configured of a communication module conforming to communication standards such as W-CDMA or LTE, and wireless LAN standards such as IEEE 802.11.

The monitor 36 displays various information regarding the charging apparatus 30. The monitor 36 displays an input screen used for the initial setting of the charging apparatus 30, for example. The initial setting means setting the charging apparatus 30 that should be initially performed by the installation personnel after the charging apparatus 30 is installed. The details of the input screen during the initial setting will be described below. The monitor 36 is provided with a touch panel, for example. A user manipulates the charging apparatus 30 through the touch panel provided in the monitor 36, for example.

The control portion 38 includes a CPU, an input and output interface, and the like. The control portion 38 implements various functions of the charging apparatus 30, based on a signal from each sensor and information stored in the memory 32.

As described above, the server 10 provides positional information of the charging apparatus 30 that is in the vicinity of the current location of the vehicle 20, to the vehicle 20. The vicinity of the current location of the vehicle 20 means a range displayed on the navigation device 26 during the guidance for the destination by the navigation device 26, for example. The server 10 includes a memory 12, a communication unit 16, and am control portion 18.

The memory 12 stores a charging apparatus database (DB) 14. The charging apparatus DB 14 is a database for managing information regarding the charging apparatus 30 installed at each location. The charging apparatus DB 14 includes a positional information DB 15, and a charging-method information DB 19. The positional information DB 15 is a database for storing positional information indicating the installation position of the charging apparatus 30 in association with the corresponding charging apparatus 30. The charging-method information DB 19 is a database for storing charging-method information indicating external charging methods corresponding to the charging apparatus 30 (information indicating the specification relating to external charging, of the charging apparatus 30) in association with the corresponding charging apparatus 30. The details of the charging-method information DB 19 will be described below.

FIG. 2 is a view illustrating an example of the positional information DB 15. As described above, referring to FIG. 2, the positional information DB 15 is a database for storing positional information of the charging apparatus 30 in association with the corresponding charging apparatus 30. The positional information managed in the positional information DB 15 is GPS data, for example. GPS data includes latitude information and longitude information of a position (location) where the charging apparatus 30 is installed. In the example illustrated in FIG. 2, charging apparatuses A1, B1, C1, D1, E1 are installed at positions respectively indicated by GPS data items A2, B2, C2, D2, E2. Although the details will be described below, the GPS data of the charging apparatus 30 is transmitted from the charging apparatus 30 to the server 10 through the communication unit 34 during the initial setting of the charging apparatus 30.

Referring to FIG. 1 again, the communication unit 16 is configured to communicate with the vehicle 20 and the charging apparatus 30. The communication unit 16 is configured of a communication module conforming to communication standards such as W-CDMA or LTE, wireless LAN standards such as IEEE 802.11, and wired LAN standards such as Ethernet (registered trademark).

The control portion 18 includes a CPU, an input and output interface, and the like. The control portion 18 implements various functions of the server 10, based on information received through the communication unit 16, and information stored in the memory 12.

Various Charging Methods

FIG. 3 is a view illustrating an example of external charging methods. As described above, referring to FIG. 3, the external charging methods include contact charging methods and non-contact charging methods.

The contact charging methods include "alternating current (AC) charging methods" and "direct current (DC) quick charging methods". In the AC charging methods, alternating-current power is supplied from the charging apparatus 30 to the vehicle 20, and thereby external charging is performed. In the DC quick charging methods, direct-current power is supplied from the charging apparatus 30 to the vehicle 20, and thereby external charging is performed.

The AC charging methods include a method in which a power supply of AC 100 V is used (hereinafter, referred to as an "AC 100 V method"), and a method in which a power supply of AC 200 V is used (hereinafter, referred to as an "AC 200 V method"). The DC quick charging methods include a "CHAdeMO (registered trademark) method" (hereinafter, referred to as a "CHAdeMO method"), and a "Combined Charging System method (hereinafter, referred to as a combo method)". Each of the CHAdeMO method and the combo method is an international standard of DC quick charging.

Meanwhile, in the non-contact charging methods, charging methods are further classified depending on the corresponding types of each of "Wireless Power Transfer (WPT) classes", "coil methods", "parking assistance methods (optional functions)", and "an efficiency improvement function (optional function)".

The WPT classes indicate classification which define the maximum value of electric power that can be input from the system power supply to the charging apparatus 30, the minimum electric power transmission efficiency, and the like. As the WPT classes, WPT1 to WPT4 are defined. For example, in "WPT1", the maximum input electric power to the charging apparatus 30 is defined as 3.7 kVA, and in "WPT2", the maximum input electric power is defined as 7.7 kVa. In addition, in "WPT3", the maximum input electric power is defined as 11.1 kVA, and in "WPT4", the maximum input electric power is defined as 22 kVA.

The coil methods indicate the types of a power receiving coil and a power transmission coil respectively mounted in the vehicle 20 corresponding to the non-contact charging methods, and the charging apparatus 30 corresponding to the non-contact charging methods. For example, there are "circular coils" and "solenoidal coils" in the coil methods.

The parking assistance methods indicate functions of supporting the parking of the vehicle 20 with respect to the charging apparatus 30. For example, the parking assistance methods include a "camera method" and a "low electric power method".

The camera method is a method of supporting the parking of the vehicle 20 by using a camera mounted on the bottom surface of the vehicle 20, for example. In the vehicle 20 corresponding to the camera method, during the parking operation of the vehicle 20, the camera captures an image of a status of a part below the vehicle 20, and whether the parking of the vehicle 20 is completed is determined based on the captured image. For example, a predetermined mark is provided on the upper surface of the charging apparatus 30 corresponding to the camera method, and at a time point when a positional relationship between the predetermined mark and the vehicle 20 is recognized to become a predetermined relationship with the camera, the parking of the vehicle 20 is determined to be completed. During the parking operation of the vehicle 20, an image indicating whether the parking is completed is displayed on the navigation device 26. When a user of the vehicle 20 looks at the image displayed on the navigation device 26, the user can recognize whether the parking of the vehicle 20 with respect to the charging apparatus 30 is completed.

The low electric power method is a method for supporting the parking of the vehicle 20 by transmitting predetermined low electric power from the charging apparatus 20 to the vehicle 20 during the parking operation of the vehicle 20. In the vehicle 20 corresponding to the low electric plover method, the power reception status of the low electric power transmitted from the charging apparatus 30 corresponding to the low electric power method is detected, and whether the parking is completed is determined, based on the power reception status. For example, at a time point when the received electric power becomes maximal, the parking is determined to be completed. For example, an image indicating whether the parking is completed is displayed on the navigation device 26. When a user of the vehicle 20 looks at the image displayed on the navigation device 26, the user can recognize whether the parking of the vehicle 20 with respect to the charging apparatus 30 is completed. Depending on the type of the vehicle 20, the vehicle 20 may not have the parking assistance methods while corresponding to the non-contact charging.

The efficiency improvement function is for improving the electric power transmission efficiency in the non-contact charging. For example, the efficiency improvement function includes a "frequency control method". The frequency control method is a method for improving the electric power transmission efficiency by adjusting the power transmission frequency to the non-contact charging. The charging apparatus 30 that corresponds to the frequency control method receives information indicating the power reception status of the vehicle 20, from the vehicle 20 corresponding to the frequency control method. The charging apparatus 30 controls transmission electric power such that the reception electric power of the vehicle 20 becomes closer to the target electric power. The charging apparatus 30 adjusts the transmission frequency such that the current in the power transmission coil is minimized while controlling the electric power received by the vehicle 20 to be the target electric power. In a state where the reception electric power is maintained to be the target electric power, as the current in the power transmission coil becomes smaller, the electric power transmission efficiency can be improved. Depending on the type of the vehicle 20, the vehicle 20 may not have the frequency control method while corresponding to the non-contact charging.

In a case where the vehicle 20 and the charging apparatus 30 correspond to the same charging method, external charging according to the corresponding charging method can be performed between the vehicle 20 and the charging apparatus 30 (there is compatibility). In this case, it can be said that the charging apparatus 30 is compatible with the vehicle 20. Meanwhile, in a case where there is no overlapping charging method that the vehicle 20 and the charging apparatus 30 simultaneously correspond to, external charging cannot be performed between the vehicle 20 and the charging apparatus 30 (there is no compatibility). In this case, it can be said that the charging apparatus 30 is not compatible with the vehicle 20.

Even in a case where the parking assistance methods and the efficiency improvement method corresponding to the vehicle 20, are different from the parking assistance methods and the efficiency improvement method corresponding to the charging apparatus 30, when there are overlapping WPT classes between the vehicle 20 and the charging apparatus 30, and the coil methods thereof are the same, the non-contact charging can be performed between the vehicle 20 and the charging apparatus 30 (there is compatibility). However, in this case, the parking assistance methods or the efficiency improvement function cannot be used (optional functions cannot be used). Since the non-contact charging can be performed, in this case, it can be said that the charging apparatus 30 is compatible with the vehicle 20.

Charging-Method Information

FIG. 4 is a view illustrating an example of the charging-method information 39 (charging-method information of the charging apparatus 30). As described above, referring to FIG. 4, the charging-method information 39 is stored in the memory 32 of each charging apparatus 30. The charging-method information 39 illustrated in FIG. 4 indicates external charging methods corresponding to a charging apparatus Z1, the charging apparatus Z1 being an example of the charging apparatus 30. The reference numeral "Z1" is the ID of the charging apparatus 30.

In the drawings, the mark "O" indicates having correspondence to the corresponding charging method, and the mark "-" indicates not having correspondence to the corresponding charging method. That is, the charging apparatus Z1 corresponds to the AC 100 V method and the CHAdeMO method, but does not correspond to the AC 200 V method and the combo method, among the contact charging methods. In addition, the charging apparatus Z1 corresponds to the WPT1 and the WPT2, but does not correspond to the WPT3 and the WPT4, as the WPT classes in the non-contact charging methods. The charging apparatus Z1 corresponds to a circular coil as the cost method. The charging apparatus Z1 corresponds to the low electric power method, but does not correspond to the camera method, as the parking assistance methods. In addition, the charging apparatus Z1 does not correspond to the efficiency improvement inaction.

FIG. 5 is a view illustrating an example of the charging-method information 29 (charging-method information of the vehicle 20). As described above, referring to FIG. 5, the charging-method information 29 is stored in the memory 22 of each vehicle 20. The charging-method information 29 illustrated in FIG. 5 indicates external charging methods corresponding to a vehicle X1, the vehicle X1 being an example of the vehicle 20. The reference numeral "X1" is the ID of the vehicle 20.

The vehicle X1 corresponds to the AC 100 V method and the AC 200 V method, but does not correspond to the CHAdeMO method and the combo method, among the contact charging methods. In addition, the vehicle X1 corresponds to the WPT1 and the WPT2, but does not correspond to the WPT3 and the WPT4, as the WPT classes in the non-contact charging methods. The vehicle X1 corresponds to a circular coil as the coil method. The vehicle X1 corresponds to the camera method, but does not correspond to the low electric power method, as the parking assistance methods. In addition, the vehicle X1 corresponds to the efficiency improvement function (the frequency control method).

FIG. 6 is a view illustrating an example of the charging-method information DB 19. As described above, referring to FIG. 6, the charging-method information DB 19 is stored in the memory 12 of the server 10. The charging-method information DB 19 manages the charging-method information 39 of each of the charging apparatuses A1 to E1. The control portion 18 included in the server 10 recognizes external charging methods corresponding to each of the charging apparatuses A1 to E1, by referring to the charging-method information DB 19.

The charging-method information 39 included in the charging-method information DB 19 is transmitted (uploaded) from the charging apparatus 30 to the server 10 through the communication unit 34 during the initial setting of the charging apparatus 30. The control portion 18 included in the server 10 updates the charging-method information DB 19 by adding the charging-method information 39 received from the charging apparatus 30 through the communication unit 16, to the charging-method information DB 19.

Update of Charging Apparatus DB

Figure 7:
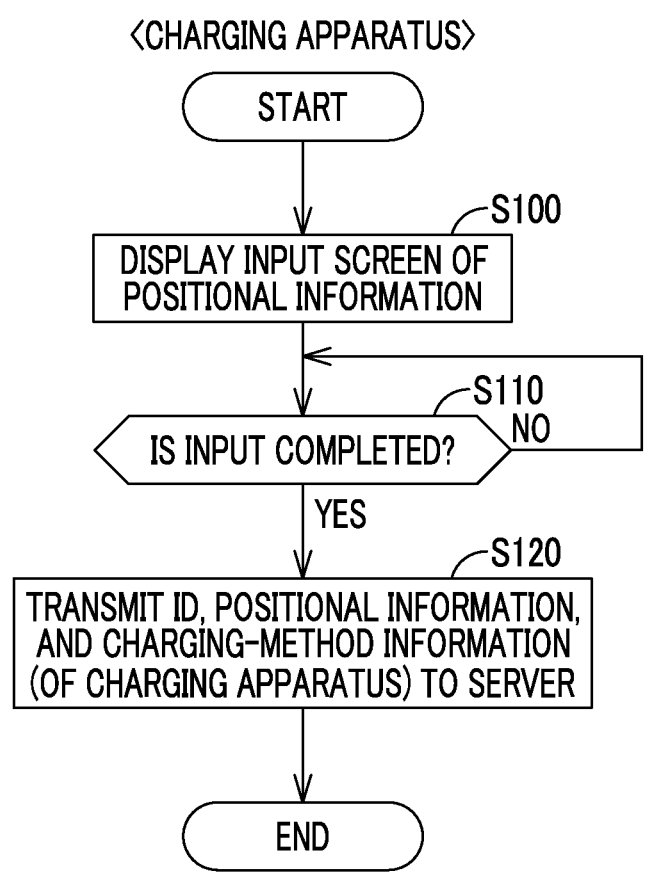
FIG. 7 is a flowchart illustrating a processing procedure for uploading information regarding a charging apparatus (positional information and charging-method information) to a server.

FIG. 7 is a flowchart illustrating a processing procedure for uploading (transmitting) information regarding the charging apparatus 30 (positional information and the charging-method information 39) to the server 10. The process illustrated in the flowchart is executed during the initial setting of the charging apparatus 30.

Referring to FIG. 7, the control portion 38 controls the monitor 36 such that the monitor 36 displays a screen for urging the installation personnel of the charging apparatus 30 to input the positional information of the charging apparatus 30 (hereinafter, referred to as "positional-information input screen") (step S100).

Figure 8:
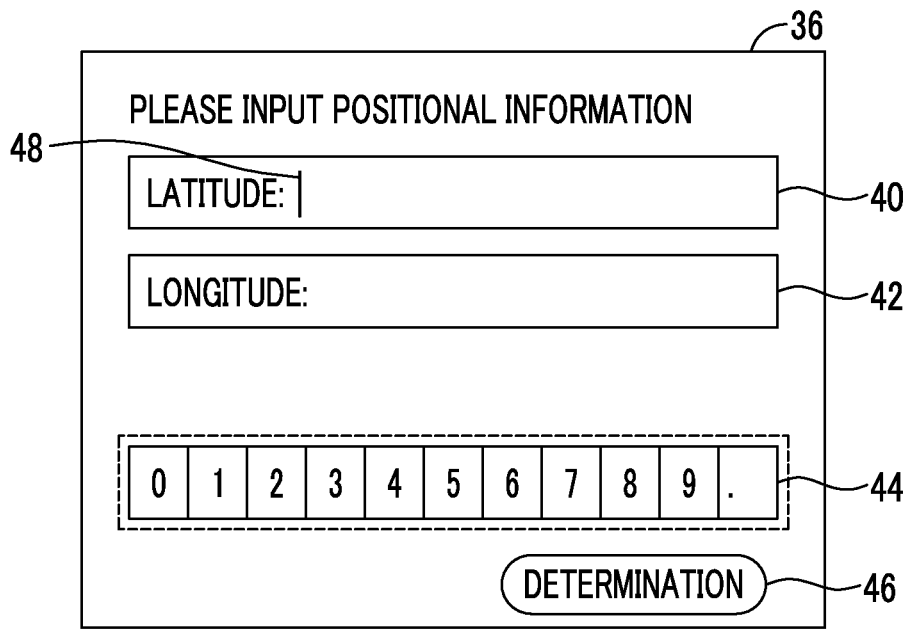
FIG. 8 is a view illustrating an example of a positional-information input screen.

FIG. 8 is a view illustrating an example of the positional-information input screen. Referring to FIG. 8, the positional-information input screen displayed on the monitor 36 includes information input bars 40, 42, a soft keyboard 44, a determination button 46, and a cursor 48.

The information input bar 40 is a region into which the latitude among the positional information of the charging apparatus 30 is input. The information input bar 42 is a region into which the longitude among the positional information of the charging apparatus 30 is input. The installation personnel moves the cursor 48 to a position where the installation personnel wants to input information and manipulates the soft keyboard 44, and thereby the installation personnel can respectively input the latitude and the longitude of the charging apparatus 30 to the information input bars 40, 42. The installation personnel can check the latitude and the longitude of the installation position of the charging apparatus 30 by using a smart phone with a GPS function or a GPS logger. When the installation personnel manipulates (touches) the determination button 46 after inputting the latitude and the longitude, the input of the positional information is completed.

Referring to FIG. 7 again, when the positional-information input screen is displayed in step S100, the control portion 38 determines whether the input of the positional information is completed (step S110). When the control portion 38 determines that the input of the positional information is not completed (NO in step S110), the control portion 38 stands by until the input of the positional information is completed. In a case where the positional information is not input even after a predetermined time elapses, the process proceeds to the end.

Meanwhile, when the control portion 38 determines that the input of the positional information is completed (YES in step S110), the control portion 38 transmits the ID, the charging-method information 39, and the positional information of the charging apparatus 30 stored in the memory 32, to the server 10 through the communication unit 34 (step S120). In this manner, the process in the flowchart is completed.

Figure 9:
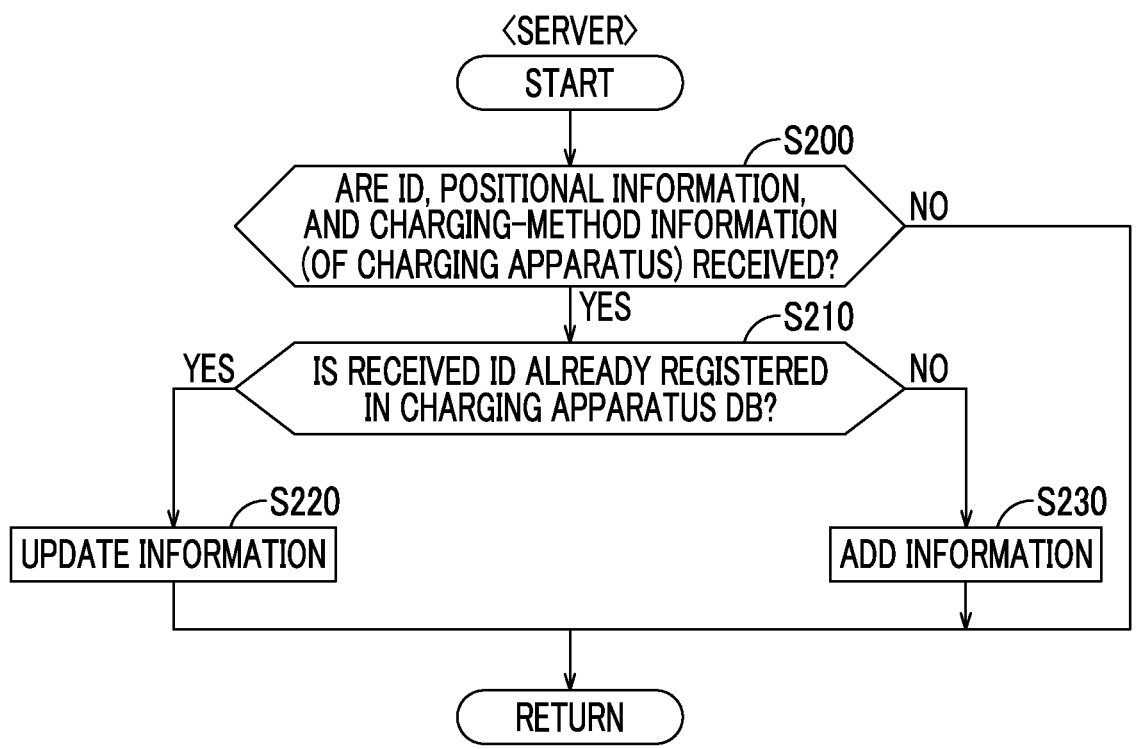
FIG. 9 is a flowchart illustrating an update processing procedure of a charging apparatus DB in the server.

FIG. 9 is a flowchart illustrating an update processing procedure of the charging apparatus DB 14 (the positional information DB 15 and the charging-method information DB 19) in the server 10. The process illustrated in the flowchart is executed at a predetermined cycle during the operation of the server 10.

Referring to FIG. 9, the control portion 18 determines whether the ID and the positional information of the charging apparatus 30, and the charging-method information 39 are received through the communication unit 16 (step S200). When the control portion 18 determines that the ID and the positional information of the charging apparatus 30, and the charging-method information 39 are not received (NO in step S200), the process proceeds to the return.

When the control portion 18 determines that the ID and the positional information of the charging apparatus 30, and the charging-method information 39 are received (YES in step S200), the control portion 18 determines whether the received ID is already registered (already stored) in the positional information DB 15 and the charging-method information DB 19 (step S210).

When the control portion 18 determines that the received ID is already registered in the positional information DB 15 and the charging-method information DB 19 (YES in step S210), the control portion 18 updates the positional information included in the positional information DB 15 and the charging-method information 39 included in the charging-method information DB 19, based on the received positional information and the received charging-method information 39 (step S220).

That is, the control portion 18 replaces the positional information that is already stored in association with the received ID, with the newsy received positional information in the positional information DB 15, and replaces the charging-method information 39 that is already stored in association with the received ID, with the newly received charging-method information 39 in the charging-method information DB 19. For example, during the initial setting of the charging apparatus 30, in a case where the installation personnel sets the wrong latitude and longitude, when correct positional information is transmitted again, the latitude and the longitude are replaced with now ones (are updated) in the positional information DB 15. Then, the process proceeds to the return.

When the control portion 18 determines that the received ID is not registered in the positional information DB 15 and the charging-method information DB 19 (NO in step S210), the control portion 18 adds the received positional information and the received charging-method information 39 respectively to the positional information DB 15 and the charging-method information DB 19 (step S230). Then, the process proceeds to the return.

In this manner, in the charging system 1 of Embodiment 1, whenever the charging apparatus 30 is newly installed, the charging apparatus DB 14 (the positional information DB 15 and the charging-method information DB 19) is updated. That is, it can be said that the positional information of each charging apparatus 30 and the charging-method information 39 are managed in the server 10. The update of the charging apparatus DB 14 includes the update and the addition of the positional information in the positional information DB 15, and the update and the addition of the charging-method information 39 in the charging-method information DB 19.

Display of Charging Apparatus

As described above, the server 10 provides the positional information of the charging apparatus 30 that is in the vicinity of the current location of the vehicle 20, to the vehicle 20. In this case, it is considered that positional information of all the charging apparatuses 30 that are in the vicinity of the current location of the vehicle 20, is provided to the vehicle 20.

In this case, the positional information of the charging apparatus 30 corresponding to only the charging methods not corresponding to the vehicle 20, is also transmitted from the server 10 to the vehicle 20 as long as the corresponding charging apparatus 30 is in the vicinity of the vehicle 20.

Figure 10:
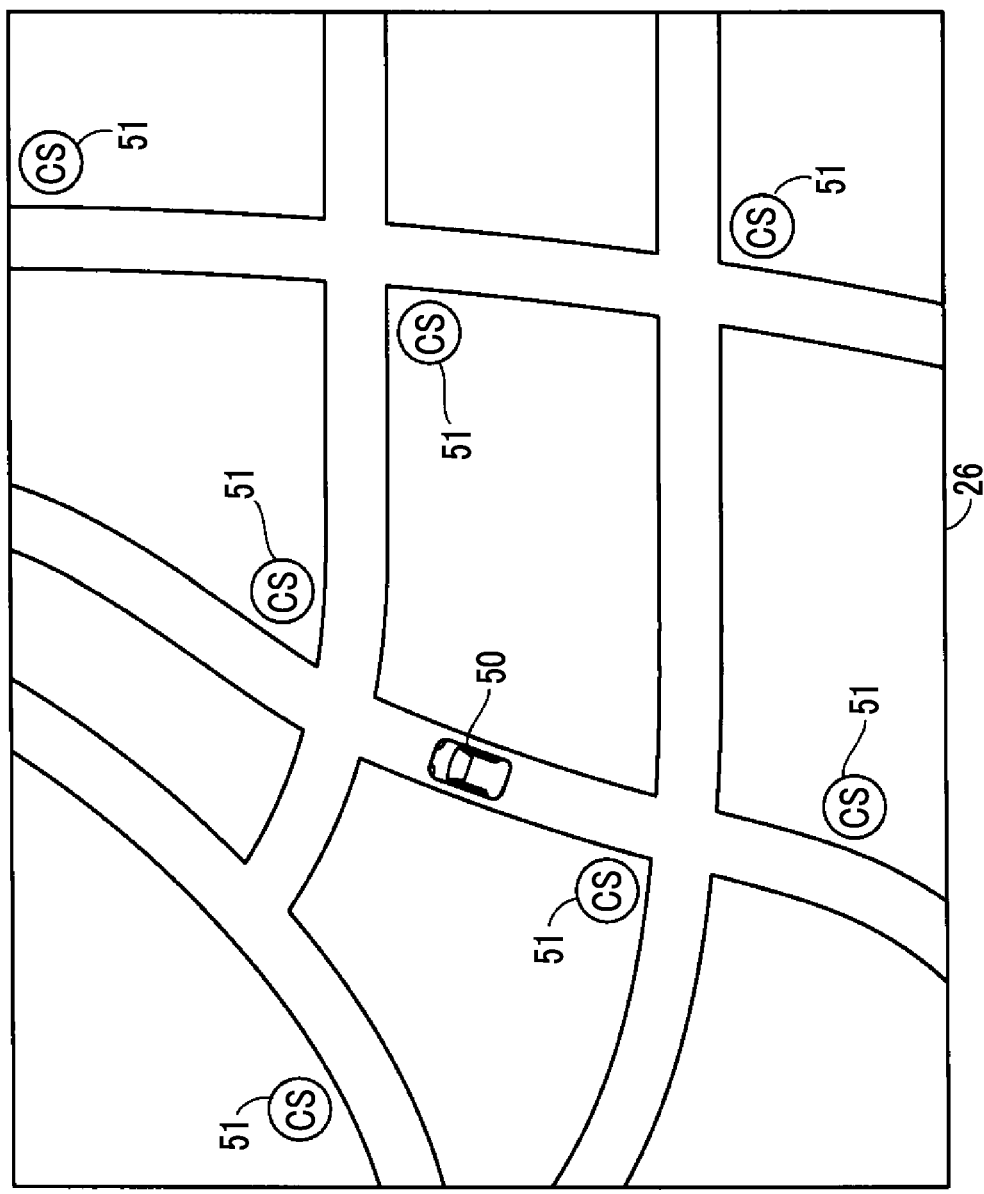
FIG. 10 is a view illustrating an example of a display screen of a navigation device in a case where positional information of all charging apparatuses that are in the vicinity of the current location of the vehicle, is provided from the server to the vehicle.

FIG. 10 is a view illustrating a display screen of the navigation device 26 in a case where positional information of all the charging apparatuses 30 that are in the vicinity of the current location of the vehicle 20, is provided from the server 10 to the vehicle 20. Referring to FIG. 10, the navigation device 26 displays a vehicle icon 50 indicating the current location of the vehicle 20, and charging-apparatus icons 51 indicating the charging apparatuses 30 in the vicinity of the vehicle 20. In the example, the charging-apparatus icons 51 displayed on the navigation device 26 include the charging-apparatus icons 51 indicating the charging apparatuses 30 corresponding to only the charging methods not corresponding to the vehicle 20.

Thus, the user cannot determine which charging apparatus 30 is compatible with the vehicle 20 by only looking at the screen illustrated in FIG. 10. Therefore, the user has to search for the charging apparatus 30 corresponding to the charging methods corresponding to the vehicle 20, from among the charging apparatuses 30 (charging-apparatus icons 51) displayed on the navigation device 26.

Figure 11:
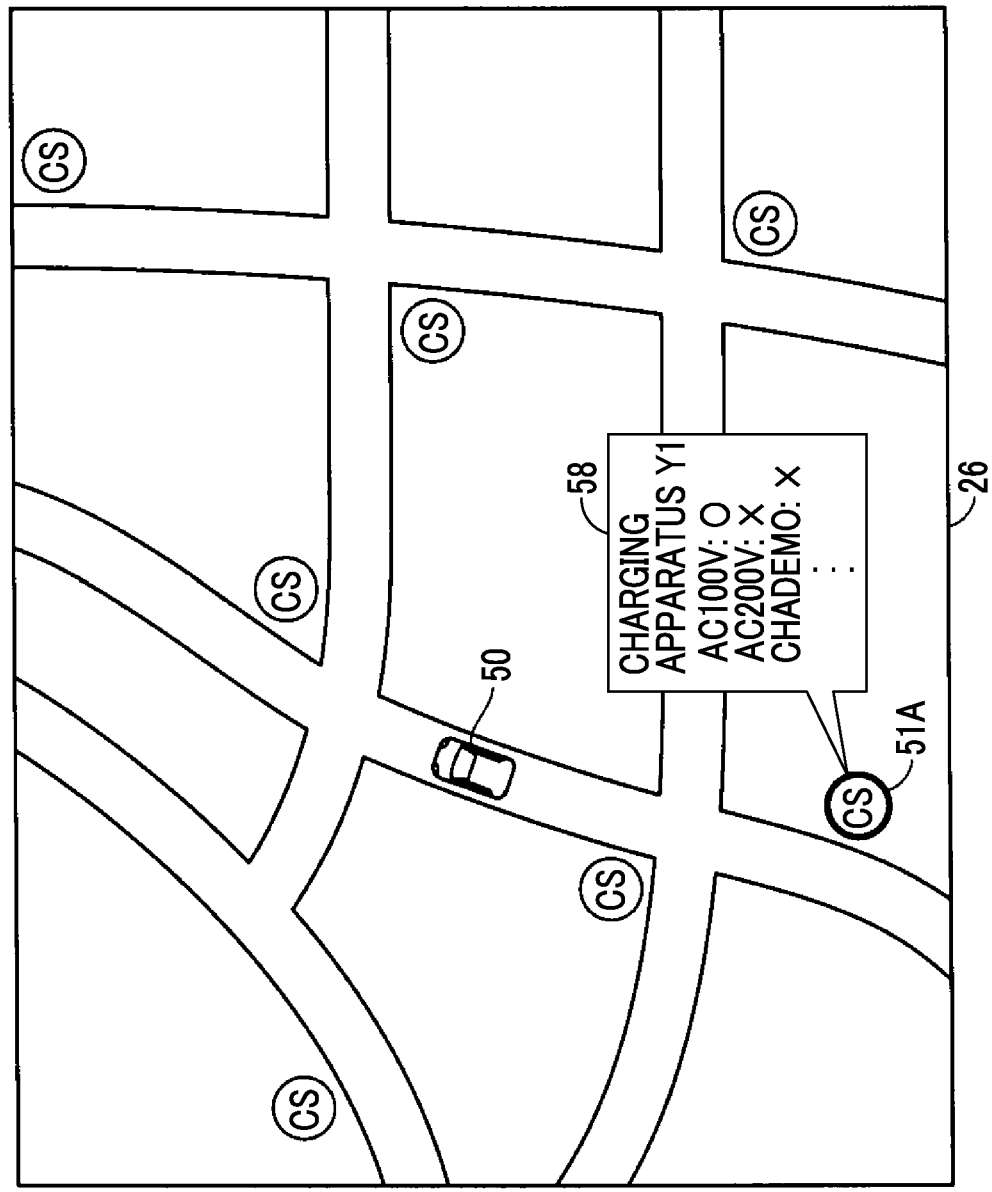
FIG. 11 is a view illustrating an example of a method for searching for a charging apparatus compatible with the own vehicle, from among the charging apparatuses displayed on the navigation device in the example illustrated in FIG. 10.

FIG. 11 is a view illustrating an example of a method for searching for the charging apparatus 30 compatible with the vehicle 20, from among the charging apparatuses 30 displayed on the navigation device 26 in the example illustrated in FIG. 10. Referring to FIG. 11, the user touches a charging-apparatus icon 51A, for example. Then, an information window 58 is displayed on the navigation device 26. The information window 58 indicates the external charging methods of the charging apparatus 30 indicated by the charging-apparatus icon 51A. In this case, in order to search for the charging apparatus 30 compatible with the vehicle 20, the user has to sequentially touch the charging-apparatus icons 51 displayed on the navigation device 26 to check the information window 58. Such an operation is complicated for the user.

Thus, in the server 10 according to Embodiment 1, when the control portion 18 receives the charging-method information 29 indicating the external charging methods corresponding to the vehicle 20, from the vehicle 20 through the communication unit 16, the control portion 18 extracts the charging apparatus 30 compatible with the vehicle 20 by referring to the charging-method information 29 and the charging-method information DB 19. The control portion 18 controls the communication unit 16 such that the communication unit 16 transmits the positional information of the extracted charging apparatus 30 to the vehicle 20.

Figure 12:
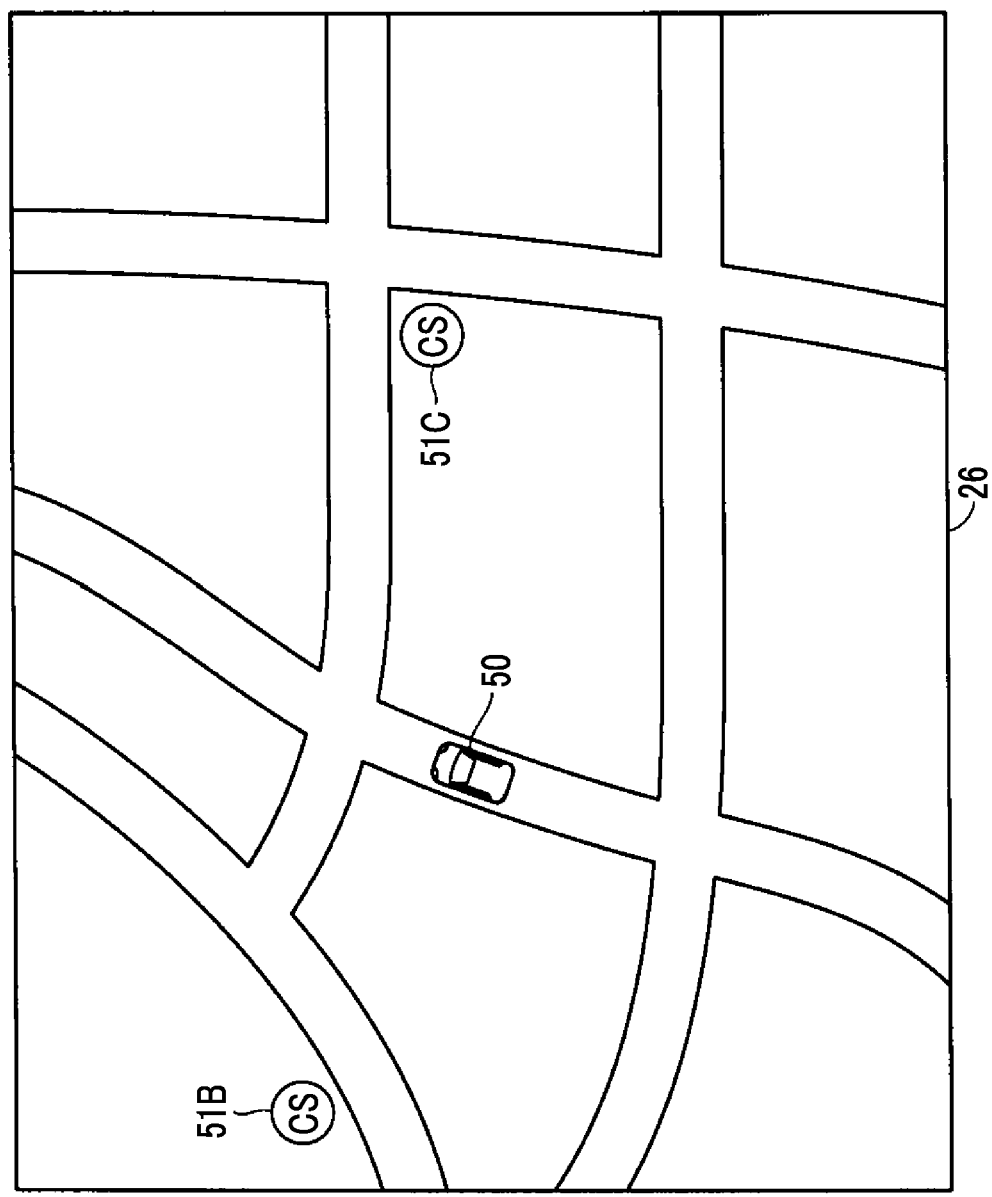
FIG. 12 is a view illustrating an example of a display screen of the navigation device.

FIG. 12 is a view illustrating an example of a display screen of the navigation device 26 in Embodiment 1. Referring to FIG. 12, in Embodiment 1, the navigation device 26 displays only the positional information (charging-apparatus icons 51B, 51C) of the charging apparatuses 30 compatible with the vehicle 20, among the charging apparatuses 30 that are in the vicinity of the vehicle 20. Accordingly, with the server 10, the user of the vehicle 20 can easily recognize the position of the charging apparatus 30 compatible with the own vehicle 20, even without searching for the charging apparatus 30 compatible with the own vehicle 20, from among the charging apparatuses 30 that include the charging apparatus 30 corresponding to only the charging methods not corresponding to the vehicle 20.

Display Processing Procedure of Charging Apparatus Compatible with Own Vehicle

Figure 13:
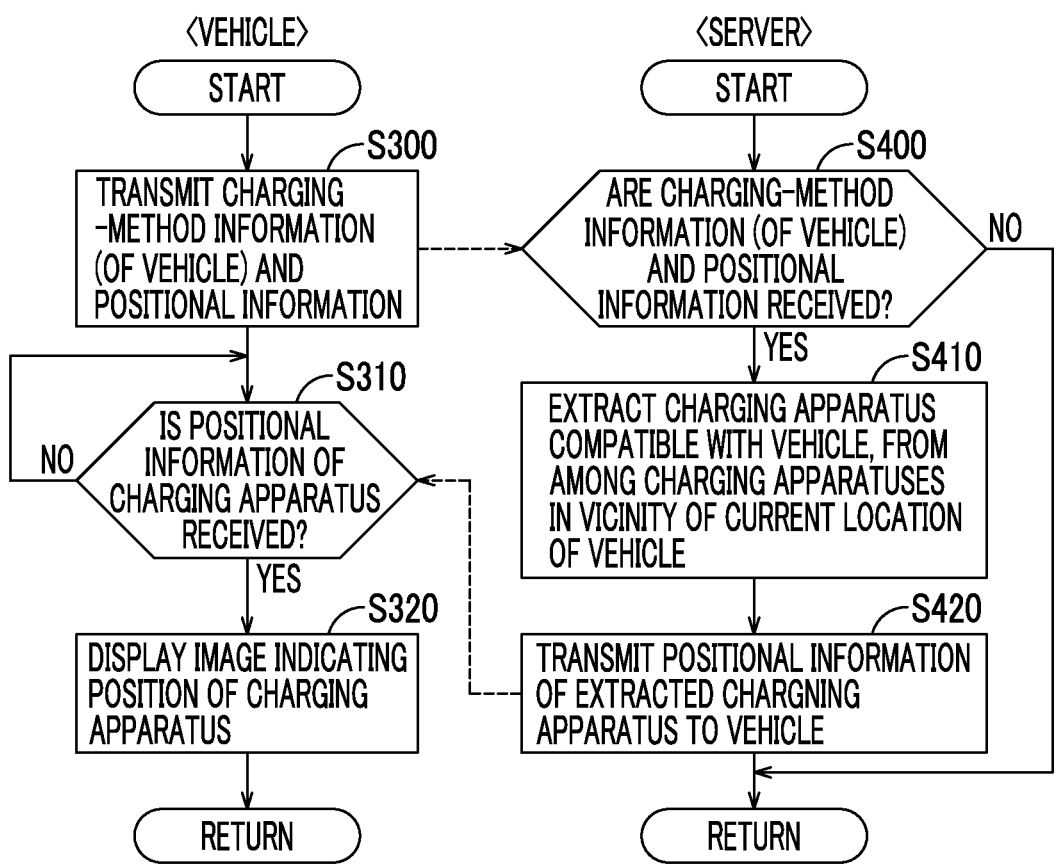
FIG. 13 is a flowchart illustrating a processing procedure for causing the navigation device to display positional information of the charging apparatus compatible with the own vehicle.

FIG. 13 is a flowchart illustrating a processing procedure for causing the navigation device 26 to display the positional information of the charging apparatus 30 compatible with the vehicle 20. The process illustrated in the flowchart is executed at a predetermined cycle during the operation of the vehicle 20 and the server 10. The process executed by the electronic control unit 28 of the vehicle 20 is illustrated on the left side of FIG. 13, and the process executed by the control portion 18 of the server 10 is illustrated on the right side of FIG. 13.

Referring to FIG. 13, in the vehicle 20, the electronic control unit 28 controls the communication unit 24 such that the communication unit 24 transmits the charging-method information 29, and the positional information of the vehicle 20 to the server 10 (step S300). In addition, the electronic control unit 28 can use the GPS data detected in the navigation device 26, as the positional information of the vehicle 20, for example.

Then, the electronic control unit 28 determines whether the positional information of the charging apparatus 30 extracted by the server 10 is received from the server 10 through the communication unit 24 (step S310). When the electronic control unit 28 determines that the positional information of the charging apparatus 30 is not received from the server 10 (NO in step S310), the electronic control unit 28 stands by until the positional information of the charging apparatus 30 is received from the server 10. In a case where the positional information of the charging apparatus 30 is not received even after a predetermined time elapses, the process proceeds to the return.

When the electronic control unit 28 determines that the positional information of the charging apparatus 30 is received from the server 10 (YES its step S310), the electronic control unit 28 controls the navigation device 26 such that the navigation device 26 displays an image indicating the positions of the charging apparatuses 30 (for example, the charging-apparatus icons 51B, 51C in FIG. 12), based on the received positional information (step S320).

Meanwhile, in the server 10, the control portion 18 determines whether the charging-method information 29, and the positional information of the vehicle 20 are received from the vehicle 20 through the communication unit 16 (step S400). When the control portion 18 determines that the charging-method information 29 and the positional information are not received from the vehicle 20 (NO in step S400), the process proceeds to the return.

When the control portion 18 determines that the charging-method information 29 and the positional information are received from the vehicle 20 (YES in step S400), the control portion 18 extracts the charging apparatus 30 that is in the vicinity of the current location of the vehicle 20 and is compatible with the vehicle 20, from among the charging apparatuses 30 managed in the charging apparatus DB 14 (the positional information DB 15 and the charging-method information DB 19) (step S410).

First, the control portion 18 extracts the charging apparatuses 30 that are in the vicinity of the current location of the vehicle 20, by referring to the received positional information of the vehicle 20 and the positional information DB 15. Then, the control portion 18 extracts the charging apparatus 30 compatible with the vehicle 20, from among the charging apparatuses 30 that are in the vicinity of the current location of the vehicle 20, by referring to the charging-method information 29 and the charging-method information DB 19. In this manner, the charging apparatus 30 that is in the vicinity of the current location of the vehicle 20, and is compatible with the vehicle 20 is extracted.

Then, the control portion 18 controls the communication unit 16 such that the communication unit 16 transmits the positional information of the extracted charging apparatus 30 to the vehicle 20 (step S420). For example, the control portion 18 controls the communication unit 16 such that the communication unit 16 transmits, to the vehicle 20, the GPS data that is stored in the positional information DB 15 (FIG. 2) and is in association with the charging apparatus 30 that is extracted in step S410.

As described above, in the server 10 according to Embodiment 1, when the control portion 18 receives the charging-method information 29 indicating the external charging methods corresponding to the vehicle 20, from the vehicle 20 through the communication unit 16, the control portion 18 extracts the charging apparatus 30 compatible with the vehicle 20, by referring to the charging-method information 29 and the charging-method information DB 19.

The control portion 18 controls the communication unit 16 such that the communication unit 16 transmits the positional information of the extracted charging apparatus 30 to the vehicle 20. With the server 10, since the positional information of the charging apparatus 30 compatible with the own vehicle 20 is transmitted from the server 10 to the vehicle 20, the user of the vehicle 20 can easily recognize the position of the charging apparatus 30 compatible with the own vehicle 20.

Modification Example

In Embodiment 1, the charging apparatus DB 14 is updated when the charging apparatus 30 transmits the charging-method information 39 and the positional information to the server 10 during the initial setting of the charging apparatus 30. In the modification example of Embodiment 1, even in a case where the charging apparatus 30 does not transmit the charging-method information 39 and the positional information to the server 10 during the initial setting of the charging apparatus 30, when the vehicle 20 transmits the charging-method information 39 and the positional information to the server 10 after the external charging is completed, the charging apparatus DB 14 is updated.

Figure 14:
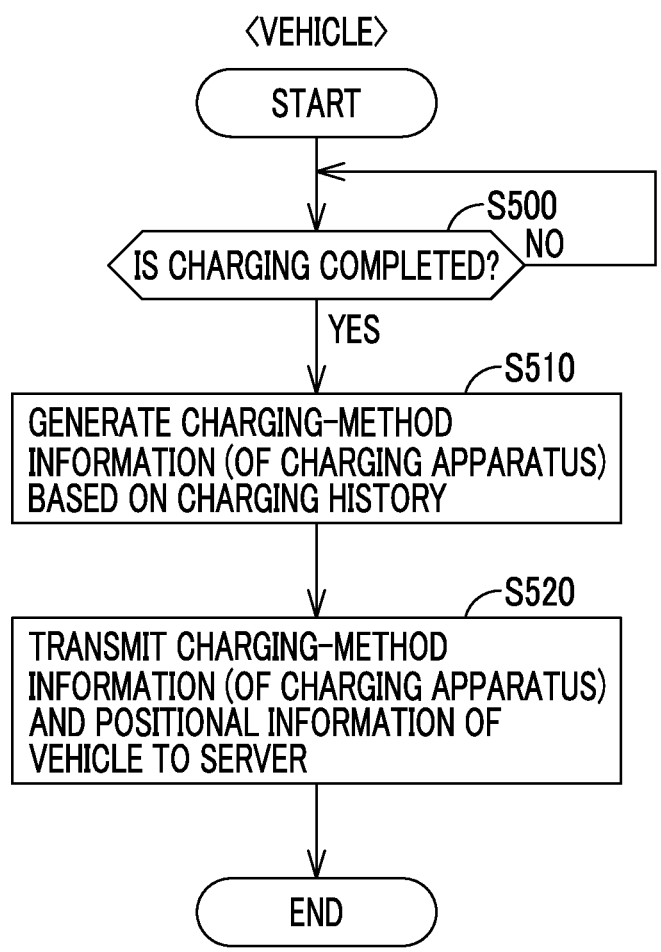
FIG. 14 is a flowchart illustrating a processing procedure for uploading information regarding a charging apparatus (positional information and charging-method information) to a server, in a modification example of Embodiment 1.

FIG. 14 is a flowchart illustrating a processing procedure for uploading information regarding the charging apparatus 30 (the positional information and the charging-method information 39) to the server 10, in the modification example of Embodiment 1. The process illustrated in the flowchart is executed during the external charging.

Referring to FIG. 14, the electronic control unit 28 determines whether the external charging is completed (step S500). When the electronic control unit 28 determines that the external charging is not completed (NO in step S500), the electronic control unit 28 stands by until the external charging is completed.

When the electronic control unit 28 determines that the external charging is completed (YES in step S500), the electronic control unit 28 regards that the charging apparatus 30 corresponds to the method that is used in the current external charging, and generates the charging-method information 39 (step S510). For example, when the external charging with the AC 100 V method is completed, the electronic control unit 28 generates the charging-method information 39 indicating that the charging apparatus 30 corresponds to the AC 100 V method. The generation of the charging-method information 39 may not be started with the completion of the external charging. For example, the charging-method information 39 may be generated when the external charging starts, or when the authentication between the vehicle 20 and the charging apparatus 30 for starting the external charging is completed.

Then, the electronic control unit 28 transmits the generated charging-method information 39, and the current-location information of the vehicle 20 (for example, GPS data detected in the navigation device 26) to the server 10 through the communication unit 24 (step S520). Accordingly, the process illustrated in the flowchart is completed. At the time when the external charging is completed, the vehicle 20 has to be at a standstill in the vicinity of the charging apparatus 30. Thus, the current-location information of the vehicle 20, transmitted from the vehicle 20 to the server 10 in step S520, can be regarded as the positional information of the charging apparatus 30.

Meanwhile, in the server 10, when the control portion 18 receives the charging-method information 39 and the positional information from the vehicle 20 through the communication unit 16, the control portion 18 updates the charging apparatus DB 14, based on the received charging-method information 39 and the received positional information. As the ID of the charging apparatus 30 which is newly added to the charging apparatus DB 14 (the positional information DB 15 and the charging-method information DB 19), for example, an ID which does not overlap with IDs of other charging apparatuses 30 may be appropriately allocated by the server 10.

With the server 10 according to the modification example of Embodiment 1, even in a case where the charging apparatus 30 does not transmit the charging-method information 39 and the positional information to the server 10 during the initial setting of the charging apparatus 30, since the vehicle 20 transmits the charging-method information 39 and the positional information to the server 10 when the external charging is completed, the charging apparatus DB 14 can be updated.

Embodiment 2

In the server 10 according to Embodiment 1, all the charging apparatuses 30 compatible with the vehicle 20 in terms of the external charging methods, are extracted from among the charging apparatuses 30 that are in the vicinity of the current location of the vehicle 20, and the positional information of the extracted charging apparatuses 30 is transmitted to the vehicle 20. In a server according to Embodiment 2, the charging apparatus 30 that is compatible with a vehicle 20A in terms of the external charging methods, and satisfies the user's request is extracted from among the charging apparatuses 30 that are in the vicinity of the current location of the vehicle 20A, and the positional information of the extracted charging apparatus 30 is transmitted to the vehicle 20A. Here, the different point from Embodiment 1 will be mainly described, and the description of the same configuration as that in Embodiment 1 will not be repeated.

Referring to FIG. 1 again, a charging system 1A in Embodiment 2 includes a server 10A, the vehicle 20A, and the charging apparatus 30. The vehicle 20A includes an electronic control unit 28A, and the server 10A includes a control portion 18A. Each of the electronic control unit 28A and the control portion 18A includes a CPU, an input and output interface, and the like. The electronic control unit 28A implements various functions of the vehicle 20A, based on a signal from each sensor and information stored in the memory 22. The control portion 18A implements various functions of the server 10A, based on information received through the communication unit 16, and information stored in the memory 12.

As described above, there are various types of external charging methods. Depending on the type of the external charging method, for example, the time for the external charging or the electron charge varies. In the server 10A according to Embodiment 2, the user's demand (request) such as shorter time taken for the external charging or cheaper electric charge is considered when the server 10A extracts the charging apparatus 30 that is in the vicinity of the current location of the vehicle 20A.

Figure 15:
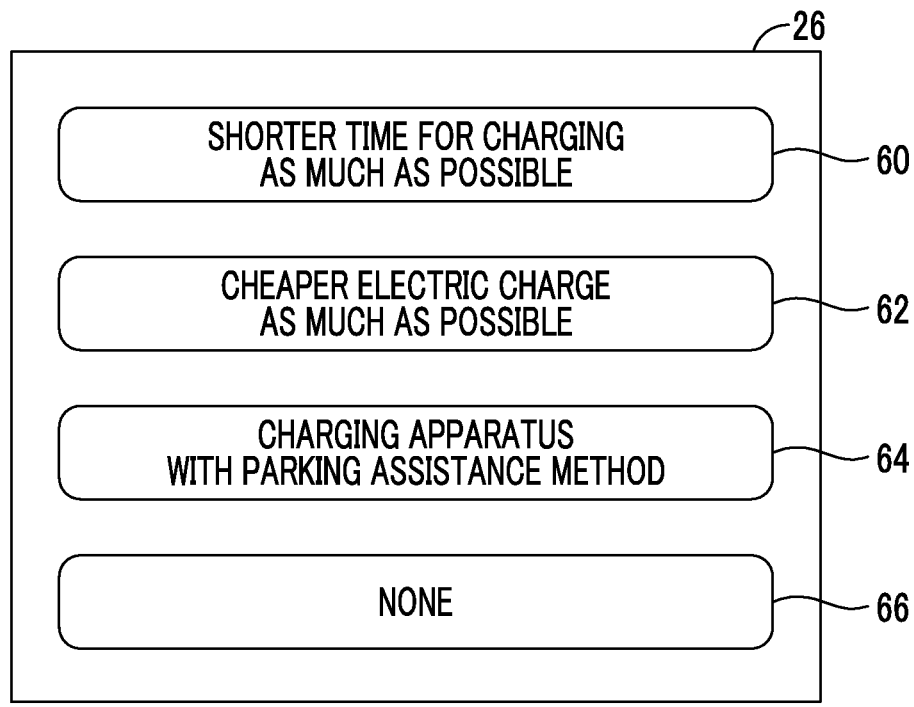
FIG. 15 is a view illustrating an example of a screen used when a user of a vehicle inputs a request regarding external charging, in Embodiment 2.

FIG. 15 is a view illustrating an example of a screen used when a user of the vehicle 20A inputs a request regarding the external charging (hereinafter, referred to as "request input screen"). Referring to FIG. 15, the request input screen is displayed on the navigation device 26, and includes setting bars 60, 62, 64, 66, for example. The user selects (touches) any of the setting bars 60 to 66, and thereby can set the request regarding the external charging. Request information indicating the set request is stored in the memory 22.

The setting bar 60 is an option for shortening the time for external charging as much as possible. When the setting bar 60 is selected, the charging apparatus 30 that is compatible with the vehicle 20A and can supply the greatest electric power to the vehicle 20A is extracted by the server 10A from among the charging apparatuses 30 that are in the vicinity of the current location of the vehicle 20A. For example, two charging apparatuses 30 that correspond to only the non-contact charging methods are in the vicinity of the current location of the vehicle 20A, one of the charging apparatuses 30 corresponds to WPT1, WPT2, and WPT3, and the other of the charging apparatuses 30 corresponds to only WPT1 and WPT2. In addition, the vehicle 20A corresponds to WPT1, WPT2, and WPT3. In this case, only the charging apparatus 30 corresponding to WPT1, WPT2, and WPT3 is extracted by the server 10A. Even when the setting bars 60 is selected, the charging apparatus 30 of which the suppliable electric power is the greatest may not necessarily be extracted only, and for example, the charging apparatus 30 of which the suppliable electric power is within several tens of percentages in the higher rank may be extracted.

The setting bar 62 is an option for making the electric charge for external charging cheap as much as possible. When the setting bar 62 is selected, the charging apparatus 30 that is compatible with the vehicle 20A and has the highest charging efficiency is extracted by the server 10A from among the charging apparatuses 30 that are in the vicinity of the current location of the vehicle 20A. For example, two charging apparatuses 30 that correspond to only the non-contact charging methods are in the vicinity of the current location of the vehicle 20A, one of the charging apparatuses 30 corresponds to the efficiency improvement function, and the other of the charging apparatuses 30 does not correspond to the efficiency improvement function. In this case, only the charging apparatus 30 corresponding to the efficiency improvement function is extracted by the server 10A. Even when the setting bar 62 is selected, the charging apparatus 30 that has the highest charging efficiency may not necessarily be extracted only, and for example, the charging apparatus 30 of which the charging efficiency is within several tens of percentages in the higher rank may be extracted.

The setting bar 64 is an option for using the charging apparatus 30 corresponding to the parking assistance methods in the non-contact charging. When the setting bar 64 in selected, the charging apparatus 30 that is compatible with the vehicle 20A and corresponds to the parking assistance methods is extracted by the server 10A from among the charging apparatuses 30 that are in the vicinity of the current location of the vehicle 20A.

The setting bar 66 is an option for causing the navigation device 26 to display the positional information of all the charging apparatuses 30 that are in the vicinity of the current location of the vehicle 20A, and are compatible with the vehicle 20A. For example, when state of charge (SOC) of the electrical storage device 25 is decreased, the user selects the setting bar 66, and thus can easily recognize the position of the charging apparatus 30 that is at a position closest to the current location of the vehicle 20A, from among the charging apparatuses 30 that are compatible with the vehicle 20A.

Figure 16:
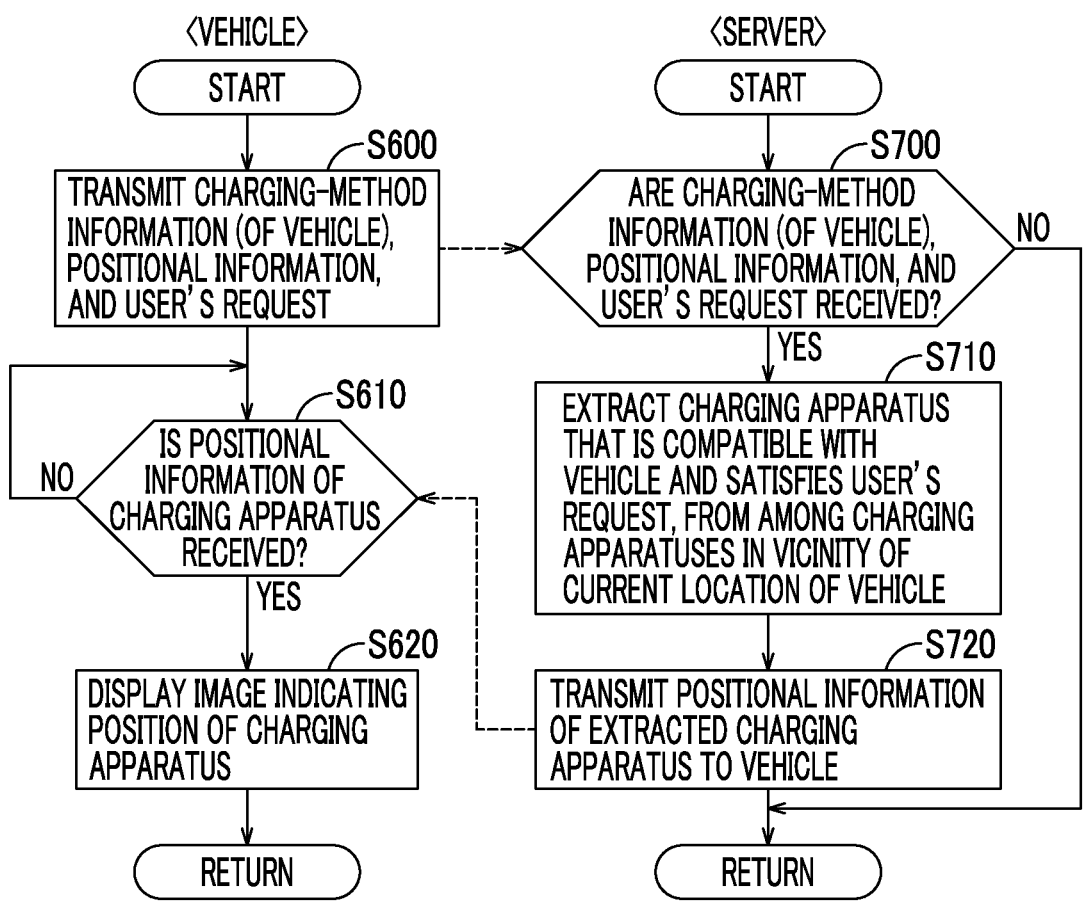
FIG. 16 is a flowchart illustrating a processing procedure for causing a navigation device to display positional information of a charging apparatus that is compatible with the vehicle and satisfies the user's request.

FIG. 16 is a flowchart illustrating a processing procedure for causing the navigation device 26 to display the positional information of the charging apparatus 30 that is compatible with the vehicle 20A and satisfies the user's request, to Embodiment 2. The process illustrated in the flowchart is executed at a predetermined cycle during the operation of the vehicle 20A and the server 10A. The process executed by the electronic control unit 28A of the vehicle 20A is illustrated on the left side of FIG. 16, and the process executed by the control portion 18A of the server 10A is illustrated on the right side of FIG. 16. The processes indicated by step S610, step S620, step S720 are respectively the same as the processes indicated by step S310, step S320, and step S420 of FIG. 13.

Referring to FIG. 16, in the vehicle 20A, the electronic control unit 28A controls the communication unit 24 such that the communication unit 24 transmit the charging-method information 29, the positional information of the vehicle 20A, and the request information stored in the memory 22 to the server 10A (step S600).

In the server 10A, the control portion 18A determines whether the charging-method information 29, the positional information of the vehicle 20A, and the request information are received from the vehicle 20A through the communication unit 16 (step S700). When the control portion 18A determines that the charging-method information 29, the positional information of the vehicle 20A, and the request information are not received (YES in step S700), the process proceeds to the return.

When the control portion 18A determines that the charging-method information 29, the positional information of the vehicle 20A, and the request information are received (YES in step S700), the control portion 18A extracts the charging apparatus 30 that is in the vicinity of the current location of the vehicle 20A, is compatible with the vehicle 20A in terms of the external charging methods, and satisfies the user's request, from among the charging apparatuses 30 managed in the charging apparatus DB 14 (step S710).

First, the control portion 18A extracts the charging apparatuses 30 that are in the vicinity of the current location of the vehicle 20A, by referring to the received positional information of the vehicle 20A and the positional information DB 15. Next, the control portion 18A extracts the charging apparatuses 30 compatible with the vehicle 20A, from among the charging apparatuses 30 that are in the vicinity of the current location of the vehicle 20A, by referring to the charging-method information 29 and the charging-method information DB 19. Then, the control portion 18A extracts the charging apparatus 30 that satisfies the user's request, from among the charging apparatuses 30 that are in the vicinity of the current location of the vehicle 20A and are compatible with the vehicle 20A, by referring to the request information. In this manner, the charging apparatus 30 that is in the vicinity of the current location of the vehicle 20A, is compatible with the vehicle 20A in terms of the external charging methods, and satisfies the user's request is extracted.

As described above, in the server 10A according to Embodiment 2, the charging apparatus 30 that satisfies the user's request is extracted from among the charging apparatuses 30 that are in the vicinity of the current location of the vehicle 20A and are compatible with the vehicle 20A, and the positional information of the extracted charging apparatus 30 is transmitted to the vehicle 20A. Accordingly, with the server 10A, the user of the vehicle 20A can easily recognize the position of the charging apparatus 30 that is compatible with the vehicle 20A and also satisfies the user's request.

Embodiment 3

In the vehicle 20A according to Embodiment 2, the charging-method information 29, the positional information of the vehicle 20A, and the request information stored in the memory 22 are transmitted to the server 10A. In a vehicle according to Embodiment 3, the information to be transmitted from the vehicle to the server is changed depending on SOC of the electrical storage device 25. Specifically, in a case where the SOC of the electrical storage device 25 is equal to or greater than a predetermined value, similar to Embodiment 2, the charging-method information 29, the positional information of the vehicle, and the request information are transmitted from the vehicle to the server. Meanwhile, in a case where the SOC of the electrical storage device 25 is less than the predetermined value, the request information is not transmitted to the server, and only the charging-method information 29 and the positional information of the vehicle are transmitted from the vehicle to the server.

Referring to FIG. 1 again, a charging system 1B of Embodiment 3 includes a server 10B, a vehicle 20B, and the charging apparatus 30. The vehicle 20B includes an electronic control unit 28B, and the server 10B includes a control portion 18B. Each of the electronic control unit 28B and the control portion 18B includes a CPU, an input and output interface, and the like. The electronic control unit 28B implements various functions of the vehicle 20B, based on a signal from each sensor and information stored in the memory 22. The control portion 18B implements various functions of the server 10B, based on information received through the communication unit 16, and information stored in the memory 12.

In the vehicle 20A according to embodiment 2, the request information of the user is transmitted from the vehicle 20A to the server 10A regardless of the SOC of the electrical storage device 25, and only the positional information of the charging apparatus 30 that is compatible with the vehicle 20A and also satisfies the user's request is displayed on the navigation device 26. In this manner, the user can easily recognize the position of the charging apparatus 30 that is compatible with the vehicle 20A and also satisfies the user's request.

However, even a case where the SOC of the electrical storage device 25 is low and thus the electrical storage device 25 has to be charged as soon as possible, when the charging apparatuses 30 to be displayed on the navigation device 26 are refined according to the request information, the charging apparatus 30 that is at a position closest to the current location of the vehicle 20B may not be displayed on the navigation device 26. As a result, a situation in which the electrical storage device 25 cannot be easily charged may happen.

Thus, in the vehicle 20B according to Embodiment 3, in a case where the SOC of the electrical storage device 25 is less then the predetermined value, the electronic control unit 28B does not transmit the request information to the server 10B, and transmits only the charging-method information 29 and the positional information of the vehicle 20B to the server 10B. With the vehicle 20B, in an emergency of the SOC of the electrical storage device 25 being less than the predetermined value, since the charging apparatuses 30 displayed on the navigation device 26 are not refined according to the request information, the user can recognize the charging apparatus 30 that is at a position closest to the current location of the vehicle 20B, among the charging apparatuses 30 that are compatible with the vehicle 20B.

FIG. 17 is a flowchart illustrating a processing procedure for causing the navigation device 26 to display the positional information of the charging apparatus 30, in Embodiment 3. The process illustrated in the flowchart is executed at a predetermined cycle during the operation of the vehicle 20B and the server 10B. The process executed by the electronic control unit 28B of the vehicle 20B is illustrated on the left side of FIG. 17, and the process executed by the control portion 18B of the server 10B is illustrated on the right side of FIG. 17. The processes indicated by step S830, step S840, and step S940 are respectively the same as the processes indicated by step S610, step S620, and step S720 of FIG. 16.

Referring to FIG. 17, in the vehicle 20B, the electronic control unit 28B determines whether the SOC of the electrical storage device 25 is less than a predetermined value Th1 (step S800). The predetermined value Th1 is a reference value set in advance, and for example, is a value that when the vehicle 20B subsequently travels 10 km, the SOC of the electrical storage device 25 becomes the lower limit value.

When the electronic control unit 28B determines that the SOC of the electrical storage device 25 is less than the predetermined value Th1 (YES in step S800), the electronic control unit 28B controls the communication unit 24 such that the communication unit 24 transmits the charging-method information 29 and the positional information of the vehicle 20B to the server 10B (step S810). That is, in this case, the request information stored in the memory 22 is not transmitted to the server 10B.

Meanwhile, when the electronic control unit 28B determines that the SOC of the electrical storage device 25 is equal to or greater than the predetermined value Th1 (NO in step S800), the electronic control unit 28B controls the communication unit 24 such that the communication unit 24 transmits the charging-method information 29, the positional information of the vehicle 20B, and the request information to the server 10B (step S820).

In the server 10B, the control portion 18B determines whether the charging-method information 29 and the like are received from the vehicle 20B through the communication unit 16 (step S900). When the control portion 18B determines that the charging-method information 29 and the like are not received (NO in stop S900), the process proceeds to the return.

When the control portion 18B determines that the charging-method information 29 and the like are received (YES in step S900), the control portion 18B determines whether the request information is included in the received information (step S910).

When the control portion 18B determines that the request information is included in the received information (YES in step S910), the control portion 18B extracts the charging apparatus 30 that is in the vicinity of the current location of the vehicle 20B, is compatible with the vehicle 20B in terms of the external charging methods, and satisfies the user's request, from among the charging apparatuses 30 that are managed in the charging apparatus DB 14 (step S920).

Meanwhile, when the control portion 18B determines that the request information is not included in the received information (NO in step S910), the control portion 18B extracts the charging apparatus 30 that is in the vicinity of the current location of the vehicle 20B and is compatible with the vehicle 20B, from among the charging apparatuses 30 that are managed in the charging apparatus DB 14 (step S930).

In this manner, in Embodiment 3, when the SOC of the electrical storage device 25 is less than the predetermined value Th1, the request information is not transmitted from the vehicle 20B to the server 10B, and the server 10B extracts all the charging apparatuses 30 that are in the vicinity of the current location of the vehicle 20B and is compatible with the vehicle 20B. Accordingly, with the vehicle 20B, when the SOC of the electrical storage device 25 is less than the predetermined value Th1, the user can recognize the charging apparatus 30 that is at a position closest to the current location of the vehicle 20B, from among the charging apparatuses 30 that are compatible with the vehicle 20B.

Other Embodiments

As described above, Embodiments 1 to 5 have been described as she embodiments. However, the application range of the disclosure is not limited to Embodiments 1 to 3. Here, an example of other embodiments will be described.

In Embodiments 1 to 3, the charging apparatus 30 is extracted by the servers 10, 10A, 10B, only the positional information of the charging apparatus 30 is transmitted from the servers 10, 10A, 10B to the vehicles 20, 20A, 20B. However, the information transmitted from the servers 10, 10A, 10B to the vehicles 20, 20A, 20B is not limited to the positional information of the charging apparatus 30. For example, in addition to the positional information of the charging apparatus 30, the charging-method information 39 that is associated with the charging apparatus 30 in the charging-method information DB 19 may be transmitted from the servers 10, 10A, 10B to the vehicles 20, 20A, 20B. For example, in the vehicles 20, 20A, 20B, when the navigation device 26 displays the external charging methods corresponding to each charging apparatus 30, the user can decide a charging apparatus 30 where the user desires to head by referring to more denoted information regarding the charging apparatuses 30.

In Embodiments 1 to 3, the charging apparatus 30 that is in the vicinity of the current location of the vehicles 20, 20A, 20B is extracted by the servers 10, 10A, 10B. However, the charging apparatus 30 extracted by the servers 10, 10A, 10B may not necessarily be in the vicinity of the current location of the vehicles 20, 20A, 20B. For example, even in a case where the charging apparatus 30 is at a position which is not displayed on the navigation device 26 at current time point, when the charging apparatus 30 compatible with the vehicles 20, 20A, 20B is at a position where the vehicles 20, 20A, 20B pass in one hour, in the scheduled traveling route, the corresponding charging apparatus 30 way be extracted by the servers 10, 10A, 10B. For example, in the vehicles 20, 20A, 20B, in a case where the navigation device 26 displays the time it takes to reach the charging apparatus 30, even when the charging apparatus 30 that is compatible with the vehicles 20, 20A, 20B is not in the vicinity of the current location of the vehicles 20, 20A, 20B, the user can know how much time it takes until the vehicle reaches the charging apparatus 30 compatible with the vehicles 20, 20A, 20B.

In addition, in Embodiments 1 to 3, as the external charging methods (classifications), methods are exemplified in FIG. 3. However, the classification of the external charging is not limited to the examples of FIG. 3. For example, in the non-contact charging methods, wireless communication methods (for example, WiFi and Zigbee) for the communication between the vehicle and the charging apparatus may be added as the classification item.

The embodiments disclosed here should be considered that the embodiments are examples in terms of all the points, and are not limited.

What is claimed is:

1. A vehicle to which external charging is applied, the external charging being charging of an on-vehicle electrical storage device using electric power supplied from a charging apparatus outside the vehicle, and the vehicle receiving information regarding the charging apparatus from a server, the server including a first communication unit, a first memory configured to store first charging-method information indicating an external charging method corresponding to the charging apparatus, and positional information indicating an installation position of the charging apparatus, in association with the charging apparatus, and a central processing unit configured to control the first communication unit to communicate with the vehicle, the vehicle comprising:

a second memory configured to store second charging-method information indicating an external charging method corresponding to the vehicle;

a display device configured to display an image;

a second communication unit;

an input panel configured to receive a user's request regarding the external charging; and an electronic control unit configured to control the second communication unit and the display device, wherein the electronic control unit is configured to control the second communication unit to communicate with the server such that the second communication unit transmits the second charging-method information to the server, wherein when the central processing unit is configured to receive the second charging-method information from the vehicle through the first communication unit, the central processing unit is configured to extract the charging apparatus compatible with the vehicle, by referring to the first charging-method information and the second charging-method information, and the central processing unit is configured to control the first communication unit such that the first communication unit transmits the positional information of the extracted charging apparatus to the vehicle, wherein when the electronic control unit receives the positional information from the server through the second communication unit, the electronic control unit is configured to control the display device such that the display device displays an image indicating a position of the charging apparatus according to the positional information, wherein the electronic control unit is configured to control the second communication unit such that the second communication unit transmits request information indicating the user's request and the second charging-method information to the server, wherein when the central processing unit receives the request information and the second charging-method information from the vehicle through the first communication unit, the central processing unit is configured to extract the charging apparatus that is compatible with the vehicle and satisfies the user's request, by referring to the first charging-method information, the second charging-method information, and the request information, and wherein when state of charge of the electrical storage device is less than a predetermined value, the electronic control unit is configured to control the second communication unit such that the second communication unit does not transmit the request information to the server and transmits the second charging-method information to the server.

2. The vehicle according to claim 1, wherein the first communication unit is further configured to communicate with the charging apparatus, and wherein when the central processing unit receives the first charging-method information and the positional information from the charging apparatus through the first communication unit, the central processing unit is configured to cause the first memory to store the first charging-method information and the positional information in association with the charging apparatus.

* * * * *

UNITED STATES PATENT AND TRADEMARK OFFICE
CERTIFICATE OF CORRECTION

PATENT NO. : 10,661,661 B2
APPLICATION NO. : 15/729122
DATED : May 26, 2020
INVENTOR(S) : Takahiro Misawa Page 1 of 2

It is certified that error appears in the above-identified patent and that said Letters Patent is hereby corrected as shown below:

On the Title Page

Item (72), inventor, city, delete "Okazaki" and insert --Okazaki-shi Aichi-ken--, therefor.

In the Specification

In Column 3, Line(s) 27, after "unit", insert --,--, therefor.

In Column 6, Line(s) 52, after "destination", insert --,--, therefor.

In Column 7, Line(s) 35, delete "30;" and insert --30,--, therefor.

In Column 8, Line(s) 2, before "control", delete "am" and insert --an--, therefor.

In Column 8, Line(s) 64, before "used", delete "Is" and insert --is--, therefor.

In Column 9, Line(s) 55, delete "20" and insert --30--, therefor.

In Column 9, Line(s) 57, delete "plover" and insert --power--, therefor.

In Column 11, Line(s) 12, delete "cost" and insert --coil--, therefor.

In Column 11, Line(s) 16, delete "inaction" and insert --function--, therefor.

In Column 13, Line(s) 10, delete "newsy" and insert --newly--, therefor.

In Column 13, Line(s) 20, delete "now" and insert --new--, therefor.

In Column 13, Line(s) 42, after "Apparatus", insert --compatible with Own Vehicle--, therefor.

Signed and Sealed this
Fourth Day of August, 2020

Andrei Iancu
*Director of the United States Patent and Trademark Office*

CERTIFICATE OF CORRECTION (continued)
U.S. Pat. No. 10,661,661 B2

In Column 17, Line(s) 55, delete "electron" and insert --electric--, therefor.

In Column 18, Line(s) 67, after "request,", delete "to" and insert --in--, therefor.

In Column 19, Line(s) 23, delete "YES" and insert --NO--, therefor.

In Column 20, Line(s) 30, delete "embodiment" and insert --Embodiment--, therefor.

In Column 20, Line(s) 52, delete "then" and insert --than--, therefor.

In Column 22, Line(s) 10, delete "1 to 5" and insert --1 to 3--, therefor.

In Column 22, Line(s) 11, delete "she" and insert --the--, therefor.

In Column 22, Line(s) 30, delete "denoted" and insert --detailed--, therefor.